United States Patent [19]
Takishima et al.

[11] Patent Number: 5,278,401
[45] Date of Patent: Jan. 11, 1994

[54] OPTICAL DISC APPARATUS HAVING FIVE LIGHT RECEIVING AREAS FOR DETECTING FOCUS ERROR AND TRACKING ERROR

[75] Inventors: Suguru Takishima; Isao Okuda; Masahiro Oono; Koichi Maruyama; Masato Noguchi, all of Tokyo, Japan

[73] Assignee: Asahi Kogaku Kogyo Kabushiki Kaisha, Tokyo, Japan

[21] Appl. No.: 928,408

[22] Filed: Aug. 12, 1992

[30] Foreign Application Priority Data

| Aug. 13, 1991 | [JP] | Japan | 3-288223 |
| Aug. 13, 1991 | [JP] | Japan | 3-288224 |
| Aug. 13, 1991 | [JP] | Japan | 3-288225 |
| Aug. 13, 1991 | [JP] | Japan | 3-288226 |

[51] Int. Cl.$^5$ ............ G01J 1/20; G11B 7/00
[52] U.S. Cl. ................ 250/201.5; 369/44.41
[58] Field of Search .......... 250/201.5, 202, 201.1; 369/44.41, 44.42, 44.32

[56] References Cited

U.S. PATENT DOCUMENTS

| 4,695,158 | 9/1987 | Kotaka et al. | 250/201.5 |
| 4,724,533 | 2/1988 | Ohara et al. | |
| 4,742,218 | 5/1988 | Nakamura et al. | |
| 4,815,060 | 3/1989 | Nomura | 250/201.5 |
| 4,847,480 | 7/1989 | Maeda et al. | 250/201.5 |
| 4,998,235 | 3/1991 | Ishibashi et al. | 369/44.41 |
| 5,017,768 | 5/1991 | Takagi | 250/201.5 |
| 5,078,471 | 1/1992 | Takishima | |
| 5,103,345 | 4/1992 | Wantanabe et al. | |
| 5,126,988 | 6/1992 | Nishiguma et al. | 369/44.41 |
| 5,146,445 | 9/1992 | Nakamura et al. | 369/44.42 |
| 5,150,346 | 9/1992 | Minakuchi | |
| 5,150,348 | 9/1992 | Fujita | 369/44.41 |
| 5,153,865 | 10/1992 | Minakuchi | |
| 5,172,355 | 12/1992 | Nagahara et al. | 369/44.41 |

FOREIGN PATENT DOCUMENTS

| 0487816 | 6/1992 | European Pat. Off. | 369/44.41 |
| 0186139 | 10/1984 | Japan | 369/44.42 |
| 0059630 | 3/1986 | Japan | 369/44.41 |
| 0308735 | 12/1988 | Japan | 369/44.41 |

Primary Examiner—Michael Messinger
Attorney, Agent, or Firm—Sandler Greenblum & Bernstein

[57] ABSTRACT

A signal detecting apparatus in an optical disc apparatus having an objective lens which converges light emitted from a light source onto an optical disc and a condenser lens which converges light reflected by the optical disc and transmitted through the objective lens includes first and second light receiving elements, each having a light receiving surface located before or behind a convergence point on which the light reflected from the optical disc is converged when the objective lens is in a focal position. Each of the light receiving surfaces are split into at least four light receiving areas. The signal detecting apparatus also includes a means for calculating a sum of differences of outputs of the light receiving surfaces' inner light receiving areas, calculating a sum of differences of outputs of the light receiving surfaces' outer light receiving areas, and then calculating a difference of the sums of differences, so that a track error signal is output in accordance with the difference of sums of differences calculated by the calculating means.

11 Claims, 10 Drawing Sheets

OPTICAL DISC APPARATUS HAVING FIVE LIGHT RECEIVING AREAS FOR DETECTING FOCUS ERROR AND TRACKING ERROR

BACKGROUND OF THE INVENTION

1. Field of the Invention

The present invention relates to a signal detecting apparatus in an optical disc apparatus, in which a tracking error is detected by a push-pull method and a focusing error is detected by a spot-size method.

2. Description of Related Art

In a known optical disc apparatus, a bundle of rays reflected by an optical disc is received by light receiving surfaces of error detecting light receiving elements. The signal data output from the divided areas of the light receiving elements is used to calculate the tracking error and focusing error.

For instance, Japanese Unexamined Patent Publication (kokai) No. 61-206944 (JPP '944) (U.S. Pat. No. 4,742,218) discloses a focus error detecting system in which light reflected from an optical disc is convered into a beam spot so that the focus state of an objective lens can be detected in accordance with the size of the beam spot. This known error detecting method will be referred to as a spot-size method hereinafter.

In the spot-size method, light receiving elements are located on opposite sides of and optically equidistant from a convergence point on which the light reflected from the optical disc is converged when the objective lens is in a focused state, so that the sizes of the respective beam spots formed on the light receiving elements can be compared with each other to generate a focus error signal.

However, in an optical system as disclosed in FIG. 1 of JPP '944 mentioned above, it is impossible to detect tracking error with the same optical elements that are used for detecting the focusing error. In the optical system shown in FIG. 4 of JPP '944, both tracking error and focusing error can be detected with the same optical elements. However, the pattern into which the light receiving elements are divided is complex.

Furthermore, if the optical axis of the bundle of rays, incident upon the objective lens, is inclined with respect to the optical disc, or if the objective lens is displaced in the radial direction of the optical disc to correct tracking error, the optical path of the reflected light is deviated from a reference position. This results in the displacement of the beam spots in a direction corresponding to the radial direction of the optical disc. Consequently, in a tracking error detecting system that uses the push-pull method, even if there is no change in light intensity distribution, which is caused when the beam spot moves across the optical disc, the light receiving areas will be unbalanced, resulting in track offset signals being carried on the detected signals. Therefore, the deviation of the beam spots from the track of the optical disc and the track error signals no longer maintain a predetermined relationship, and accordingly, the position of the beam spot can not be precisely controlled by a track servo control in accordance with the detected signals.

The "track offset signal" is one of the track error signal components detected by the light receiving elements. Track offset is caused by the displacement of the beam spot on the light receiving element due to the deviation of the reflected light.

In the known focusing error detection system using the spot-size method, the resultant signal of the outputs of the two light receiving elements is set to be zero when the objective lens is in the focal position. Namely, the respective signals of the light receiving elements are not individually taken into account.

Consequently, it is necessary to adjust the position of the light receiving elements while observing the balance of the quantities of light to be received by the light receiving elements, thus resulting in a complex and troublesome adjustment operation.

Furthermore, if the light receiving elements are used to reproduce the recorded magnetic optical signals of the magnetic optical disc as disclosed in the above-mentioned JPP '944, a slight change in the balance of the quantity of light to be received by the light receiving elements due to the rotation of the polarizing surface by the Kerr effect occurs, and accordingly, the change may result in an interference contained in the focus error signal, thus resulting in an imprecise focus servo control.

In the prior art, as disclosed in JPP '944, in which each light receiving element is split into three light receiving areas, the tracking error, using the push-pull method, and the focusing error cannot be detected by the same light receiving element.

Furthermore, JPP '944 also discloses light receiving elements, each being split into three light receiving sections in the form of elongated bands, wherein the center light receiving section is split into three mosaic areas, so that the tracking error can be detected by the same light receiving element as that for detecting the focusing error. The split pattern of the light receiving element is, however, complex, especially at the center portion thereof. Accordingly, it is necessary to form a relatively large beam spot on the light receiving element, thus resulting in a decreased freedom of optical design and a large apparatus.

SUMMARY OF THE INVENTION

The primary object of the present invention is to provide a signal detecting apparatus in an optical disc apparatus, wherein both the focus error signal and the track error signals are detected by common light receiving elements without complicating the pattern of the light receiving elements, and wherein no track offset takes place when the track error signals are detected by a push-pull method.

To achieve the object mentioned above, according to the present invention, there is provided a signal detecting apparatus in an optical disc apparatus including an objective lens which converges light emitted from a light source onto an optical disc, and a condenser lens which converges the light reflected by the optical disc and transmitted through the objective lens. The signal detecting apparatus has first and second light receiving elements provided with light receiving surfaces located before or behind a point of convergence at which light reflected from the optical disc is converged when the objective lens is in a focal position. Each of the light receiving surfaces are divided into at least four light receiving areas, including outer light receiving areas and intermediate light receiving areas. The lengthwise direction of the light receiving areas are optically parallel to a tangential direction of the optical disc. The signal detecting apparatus also includes a calculating means for calculating a sum of differences of outputs of the intermediate receiving areas of the light receiving surfaces, a sum of differences of outputs of the light outer light receiving areas of the light receiving surfaces, and a difference of the sums of differences, wherein a track error signal is output in accordance with the difference of the sums of differences calculated by the calculating means.

According to another aspect of the present invention, there is provided a signal detecting apparatus in an optical disc apparatus including an objective lens which converges light emitted from a light source onto an optical disc and a condenser lens which converges the light reflected by the optical disc and transmitted through the objective lens. The signal detecting apparatus includes light receiving elements, each having a light receiving surface divided into at least four independent light receiving areas extending in a direction corresponding to a tangential direction of the optical disc. The light receiving elements are located before and behind a point of convergence at which the light reflected from the optical disc is converged when the objective lens is in a focused state.

According to still another aspect of the present invention, a signal detecting apparatus in an optical disc apparatus includes an objective lens which converges light emitted from a light source onto an optical disc, an optical element which splits the light transmitted through the objective lens into two beams of light, and a condenser lens provided before or behind the optical element to converge the reflected light. The signal detecting apparatus further includes light receiving elements, each having a light receiving surface divided into at least four independent light receiving areas extending in a direction corresponding to a tangential direction of the optical disc, wherein said light receiving elements are located before and behind a point of convergence at which the light reflected from the optical disc is converged when the objective lens is in a focused state.

According to still another object of the present invention, a signal detecting apparatus is provided in which both the focus error signal and the track error signal can be detected by common light receiving elements without complicating the split pattern of the light receiving elements.

Yet another object of the present invention is to provide a signal detecting apparatus of an optical disc apparatus in which, upon detecting the focus error signal by the spot-size method, the position of the light receiving elements can be easily adjusted without noise of the magnetic optical recorded signal being mixed in with the focus error signal.

According to an aspect of the present invention, there is provided a signal detecting apparatus in an optical disc apparatus including an objective lens which converges light emitted from a light source onto an optical disc, a beam splitter which splits the the light reflected by the optical disc into two beams of light, and a condenser lens which converges the reflected light, comprising a first light receiving element located before a convergent point on which the light reflected from the optical disc is converged when the objective lens is in a focal position, and a second light receiving element located behind the convergent point, said first and second light receiving elements being provided with light receiving surfaces, each being split into four light receiving areas in the form of elongated bands, extending in a direction corresponding to a tangential direction of the optical disc.

According to another aspect of the present invention, a signal detecting apparatus in an optical disc apparatus comprises an objective lens which converges light emitted from a light source onto an optical disc, a beam splitter which splits the the light reflected by optical disc into two beams of light, a condenser lens which converges the reflected light, a first light receiving element located before a convergent point on which the light reflected from the optical disc is converged when the objective lens is in a focal position, and a second light receiving element located behind the convergent point, wherein said first and second light receiving elements are provided with light receiving surfaces, each having more than three light receiving areas in the form of elongated bands, extending in a direction corresponding to a tangential direction of the optical disc, and said first and second light receiving elements are constructed so that the signals output from the respective light receiving areas are zero when the objective lens is in the focal position.

According to still another aspect of the present invention, there is provided a signal detecting apparatus in an optical disc apparatus including an objective lens which converges light emitted from a light source onto an optical disc, a beam splitter which splits the light reflected by the optical disc and transmitted through the objective lens into a plurality of beams of light, and a condenser lens which converges the reflected light, comprising a first light receiving element located before a convergent point on which the light reflected from the optical disc is converged when the objective lens is in a focal position, said first light receiving element being provided with a light receiving surface having five light receiving areas extending in a direction optically parallel with a tangential direction of the optical disc, and a second light receiving element located behind the convergent point, and being provided with a light receiving surface having five split light receiving areas extending in a direction corresponding to the tangential direction of the optical disc.

The present disclosure relates to subject matter contained in Japanese patent application Nos. 03-288223, 3-288224, 03-288225 and 03-288226 (all filed on Aug. 13, 1991) which are expressly incorporated herein by reference in their entirety.

BRIEF DESCRIPTION OF THE DRAWINGS

The invention will be described below in detail with reference to the accompanying drawings, in which.

DESCRIPTION OF THE PREFERRED EMBODIMENTS

Figure 1:
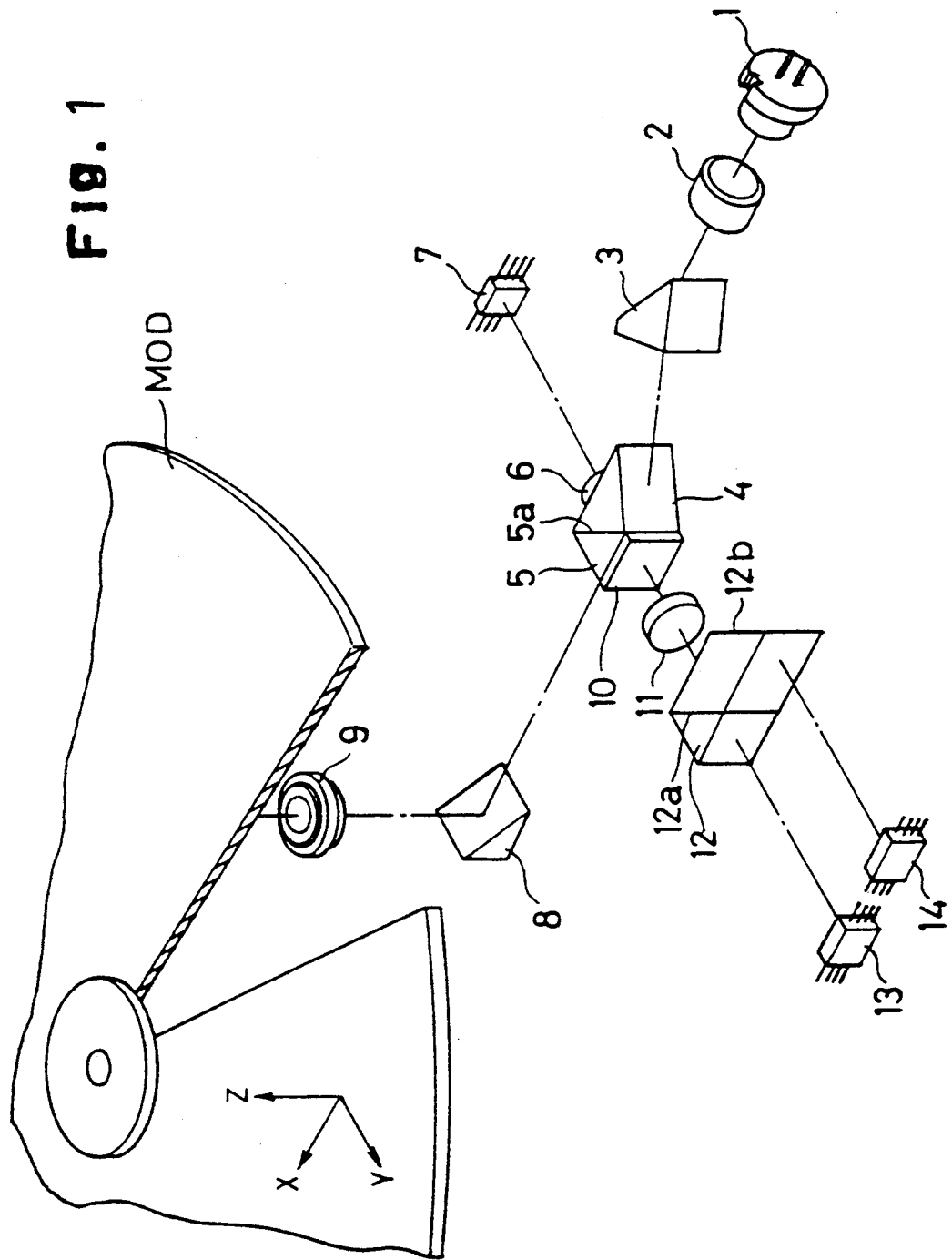
FIG. 1 is a perspective view of an optical arrangement of a magnetic optical disc apparatus to which the present invention is applied.

FIG. 1 shows a first embodiment of the present invention, applied to a data recording and reproducing apparatus of a magnetic optical disc apparatus. In the illustrated embodiment, the disc has guide grooves formed thereon.

Divergent light emitted from a semiconductor laser 1 is collimated by a collimating lens 2 and is then shaped into a beam having a circular cross section by a anamorphic prisms 3 and 4. The anamorphic prism 4 has a rectangular prism 5 secured thereto to form a half mirror 5a at a connecting surface of the anamorphic prism 4 and the rectangular prism 5. Light reflected by the half mirror 5a is converged by a condenser lens 6, onto a light receiving element 7, for automatically adjusting the output of the semiconductor laser 1.

Light transmitted through the half mirror 5a is reflected by a mirror 8, and converged onto a signal recording surface of a magnetic optical disc (MOD) by an objective lens 9. The objective lens 9 and the mirror 8 are provided in an optical head (not shown) that is movable in the radial direction X of MOD. The objective lens 9 is moved by an actuator (not shown) in the the radial direction X of the MOD and in the optical axis direction Z, perpendicular to the MOD.

Light reflected by the MOD is reflected by the half mirror 5a to be made incident on a λ/4 plate 10 which changes the direction of polarization by 45°. Thereafter, the light is converged by a condenser lens 11, and is made incident upon a polarizing beam splitter 12. P-polarized light incident upon the polarizing beam splitter 12 is transmitted through the polarizing beam splitting Surface 12s thereof, and is received by a first light receiving element 13. The S-polarized light incident upon the polarizing beam splitter 12 is reflected by the polarizing beam splitting surface 12a, and a total reflecting surface 12b thereof, to be received by a second light receiving element 14.

Before being rotated 45° by the λ/4 plate 10, the direction of polarization of the laser reflected by the MOD is rotated due to the Kerr effect in accordance with the direction of magnetization of the MOD at the point at which the beam spot is formed.

Photomagnetic data recorded on the MOD is read in accordance with the differential output of the light receiving elements 13 and 14.

Figure 2:
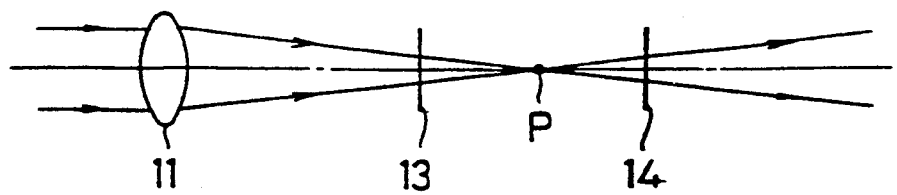
FIG. 2 is a conceptual view of an optical arrangement of the light receiving elements shown in FIG. 1.

Light receiving elements 13 and 14 are theoretically located on opposite sides of and optically equidistant from a point P on which the reflected light is converged when the objective lens 9 is focused with respect to the MOD, as shown in FIG. 2. Since the convergence point P of the reflected light varies depending on the distance between the objective lens 9 and the MOD, the sizes of the beam spots formed on the respective light receiving elements 13 and 14 change. The focus error signal can be obtained by detecting the change in the size of the beam spots Note when the objective lens 9 is in focus with respect to the MOD, the spot diameter on the MOD is minimized, and the spot diameter on the light receiving element 13 or 14 is also minimized.

Figure 3A:
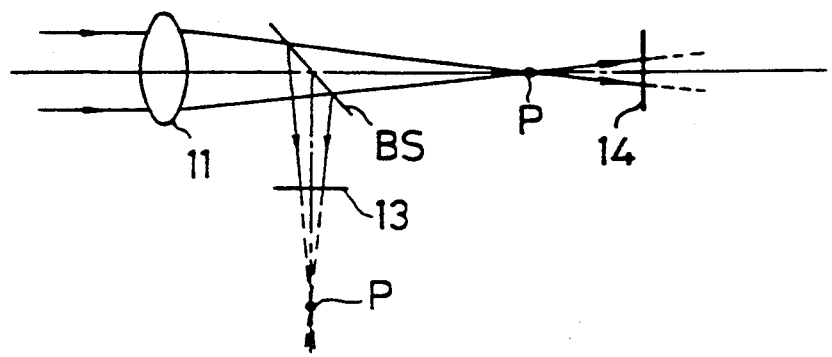
FIGS. 3A, 3B, and 3C are explanatory views showing three examples of an actual optical arrangement of the light receiving elements shown in FIG. 1.
Figure 3B:
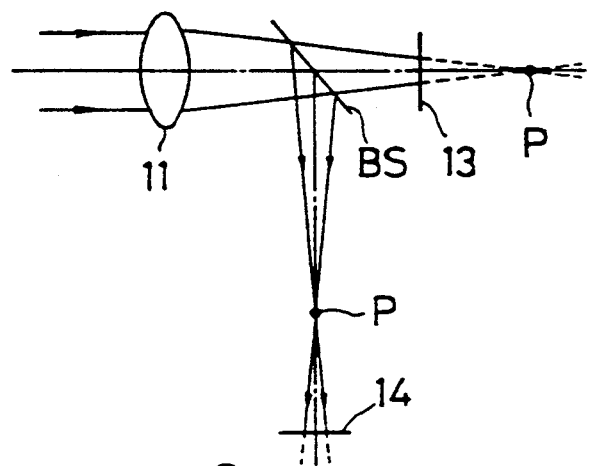
Figure 3C:
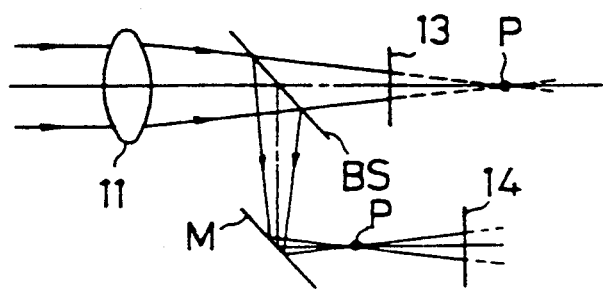

In practicality, it is impossible to realize an optical arrangement as shown in FIG. 2, and the reflected light must be split by the beam splitter BS, as shown in FIGS. 3A through 3C.

In FIG. 3A, the first light receiving element 13 is located in the optical path of the reflected light of the beam splitter BS, optically located before the convergence point P. The second light receiving element 14 is located in the optical path of light transmitted through the beam splitter BS, optically located behind the convergence point P.

Contrary to FIG. 3A, FIG. 3B shows the first light receiving element 13 located in the optical path of light transmitted through the beam splitter BS, and the second light receiving element 14 located in the optical path of the reflected light of the beam splitter BS.

FIG. 3C shows an arrangement corresponding to FIG. 1 in which a mirror M is located in the optical path of the reflected light of the beam splitter BS to realize a small and compact optical arrangement.

Figure 4:
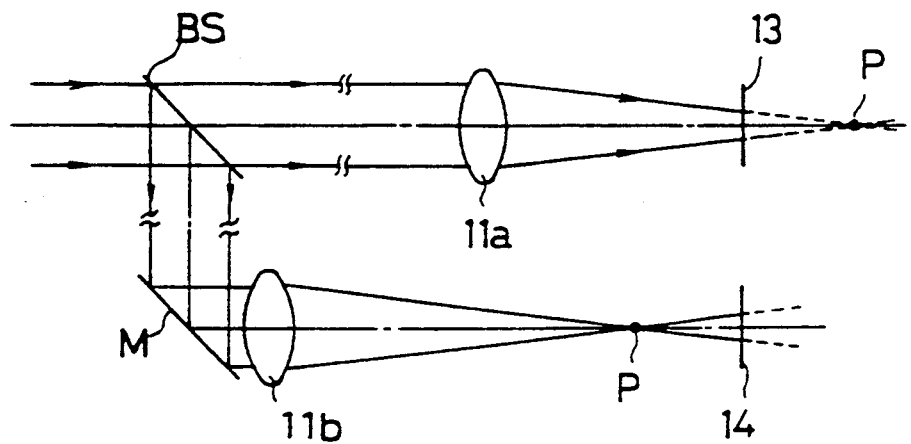
FIG. 4 is an explanatory view of another example of an actual optical arrangement of light receiving elements shown in FIG. 1.

FIG. 4 shows another example of an optical arrangement of the light receiving elements 13 and 14, in which condenser lenses 11a and 11b are located in the respective optical paths of beams split by the beam splitter BS. Since the collimated beams are incident upon the beam splitter BS, in the arrangement illustrated in FIG. 4, the transmission and reflection characteristics of the beams reflected by and transmitted through the beam splitter BS do not depend on the incident angle. Accordingly, the beams can be more precisely split, as compared with the arrangements shown in FIGS. 3A through 3C in which the converged beams are incident upon the beam splitter.

The condenser lenses 11a and 11b must have the same power and are preferably identical to make constant the variation in beam diameter due to focusing error.

Figure 5:
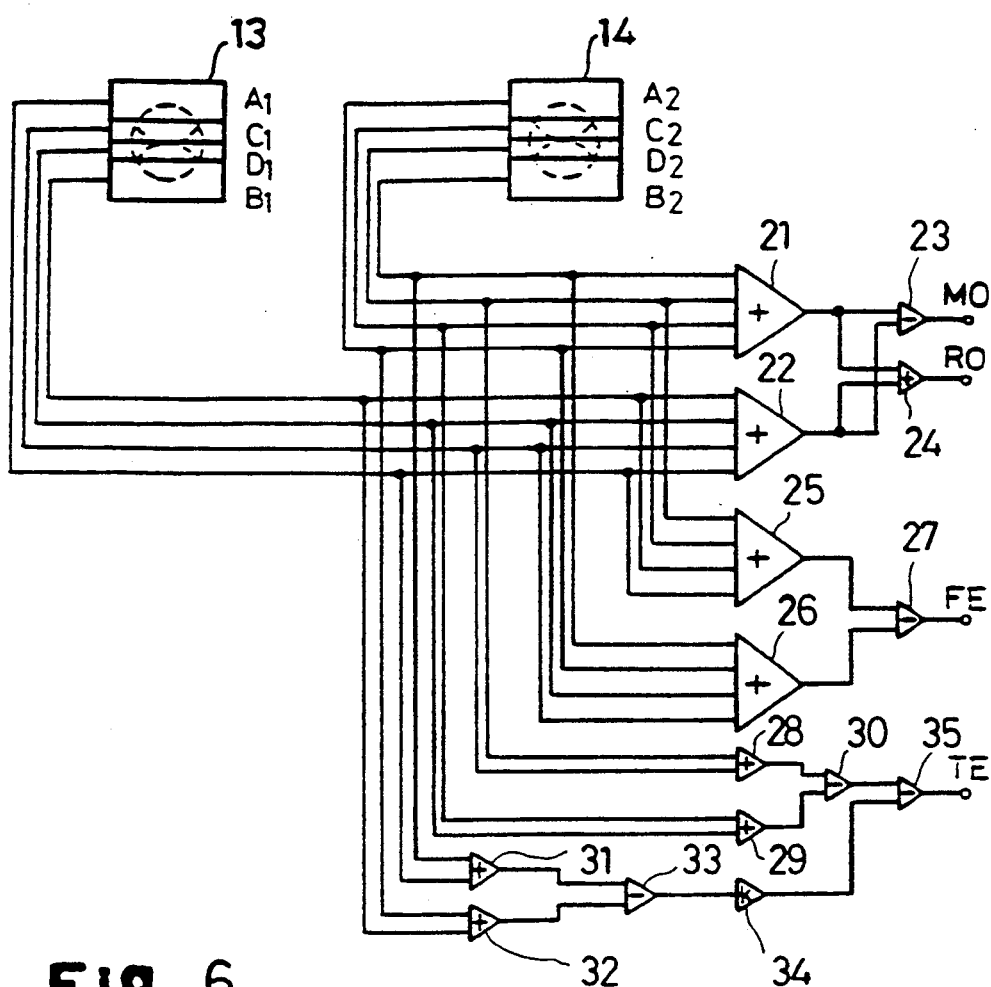
FIG. 5 is a block diagram showing a signal processing system according to a first embodiment of the present invention.

Each of the first and second light receiving elements 13 and 14 is split into four sections $A_1$, $B_1$, $C_1$ and $D_1$ ($A_2$, $B_2$, $C_2$ and $D_2$) separated by three parallel lines extending in a direction optically tangential to the MOD, as shown in FIG. 5.

The signals outputted from the respective light receiving areas $A_1$, $B_1$, $C_1$, and $D_1$ ($A_2$, $B_2$, $C_2$, and $D_2$) are processed by a signal processing circuit shown in FIG. 5, and are outputted to a reproduction circuit (not shown) and a servo control circuit (not shown) as magnetic optical disc signals MO recorded on the MOD, preformat signals RO physically recorded in the form of projections and depressions, focus error signals FE, and track error signals TE.

Numerals 21, 22, 24, 25, 26, 28, 29, 31 and 32, designate the adders; 23, 27, 32, 30, and 35 the subtracters; and 34 the integrator, respectively.

The signals mentioned above are obtained as follows.

$$MO = (A_1 + B_1 + C_1 + D_1) - (A_2 + B_2 + C_2 + D_2)$$
$$RO = (A_1 + B_1 + C_1 + D_1) + (A_2 + B_2 + C_2 + D_2)$$
$$FE = (A_1 + B_1 - C_1 - D_1) - (A_2 + B_2 - C_2 - D_2)$$
$$TE = (C_1 - D_1) + (D_2 - C_2) - k\{(A_1 - B_1) + (B_2 - A_2)\}$$

wherein $A_1$, $B_1$, $C_1$, $D_1$, $A_2$, $B_2$, $C_2$ and $D_2$ designate the outputs of the corresponding light receiving areas.

As can be seen from the foregoing, the recorded magnetic optical signal MO can be obtained by calculating a sum of the signals outputted from the four light receiving areas $A_1$ through $D_1$ of the first light receiving element 13 and a sum of the signals outputted from the four light receiving areas $A_2$ through $D_2$ of the second light receiving element, and then calculating their difference.

Preformat signal RO can be obtained by calculating the sum of the signals outputted from all the areas of the first and second light receiving elements 13 and 14.

Focus error signal FE, using the spot-size method, can be obtained by calculating a first quantity corresponding to a sum of signals of inner light receiving areas $C_1$ and $D_1$ subtracted from a sum of outer light receiving areas $A_1$ and $B_1$ of the first light receiving element 13, calculating a second quantity corresponding to a sum of inner light receiving areas $C_2$ and $D_2$ subtracted from a sum of signals of outer light receiving areas $A_2$ and $B_2$ of the second light receiving element 14, and then determining the difference between the first and second quantities (corresponding to the spot size).

Track error signal TE, using the push-pull method, can be obtained by subtracting a sum, multiplied by "k", of a difference between the signals outputted from the outer light receiving areas $A_1$ and $B_1$ of the first light receiving element 13 and a difference between the signals from the outer light receiving areas $B_2$ and $A_2$ of the second light receiving element 14 from the sum of a difference between the signals outputted from the inner light receiving areas $C_1$ and $D_1$ of the first light receiving element 13 and a difference between the signals outputted from the inner light receiving area $D_2$ and $C_2$ of the second light receiving element 14. The term "k" designates a predetermined constant for appropriately weighting the sum of the difference between the signals outputted from the outer light receiving areas of the first light receiving element and the difference between the signals from the outer light receiving areas of the second light receiving element.

Figure 6:
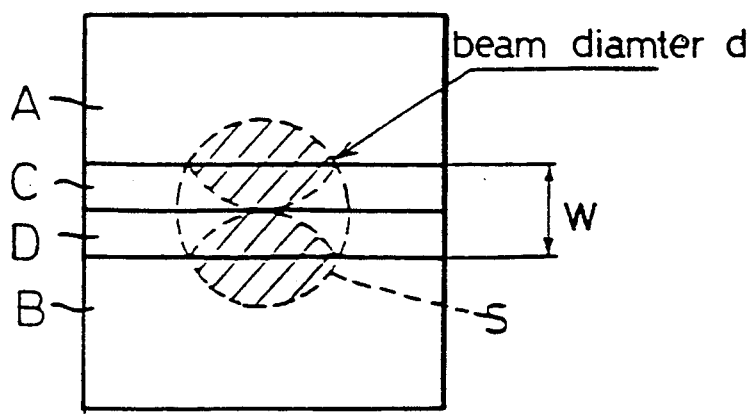
FIG. 6 is an explanatory view of light receiving areas of the light receiving element shown in FIG. 5.

The track offset signal can be eliminated as follows:

The beam spot on each light receiving element spreads over the four areas, as shown at a phantom line in FIG. 6. The circle defining the outer periphery of the beam spot S represents the range corresponding to the 0-order diffraction light, and the hatched areas represent the overlapping portion of the 0-order diffraction light and the 1st-order diffraction light.

Inner light receiving areas C ($C_1$, $C_2$) and D ($D_1$, $D_2$) of the light receiving elements 13 and 14 mainly receive the portion of the 1st-order diffraction light that exhibits a relatively large change in intensity within the beam spot S, and the outer light receiving areas A ($A_1$, $A_2$) and B ($B_1$, $B_2$) of the light receiving elements 13, 14 receive the overlapping portion of the 0-order and 1st-order diffraction light beams that exhibits a relatively small change in light intensity, respectively.

Track error signal TE obtained by the push-pull method is represented by a change in balance of quantity of $\pm$1st-order diffraction light beams. Since little change in intensity of the 0-order diffraction light across the grooves of the disc take place, the track error signals, including the track offset signals which are caused when the beam spot S shifts as a whole, are mainly detected from the outer light receiving areas A and B. Conversely, the track error signals represented by the change in intensity of the 1st-order diffraction light components due to the movement across the grooves, are mainly detected by the inner light receiving areas C and D.

If the optical axis of light incident on the objective lens is accidentally or intentionally inclined with respect to the MOD for the purpose of easy access to the tracks, and if the objective lens is radially displaced to correct deviation of the light from an intended track, the beam spot on the light receiving element is moved in a direction corresponding to the radial direction of the MOD, i.e., in a direction perpendicular to the separated lines of the light receiving areas. As a result, both the difference signal of the inner light receiving areas, and the difference signal of the outer light receiving areas are varied. Furthermore, the difference signals of the inner and outer light receiving areas are varied independently. Thus, the track offset signals can be substantially completely removed from the track error signals by carrying out the necessary calculations in which the difference signals are multiplied by a predetermined constant.

Although the signals outputted from the two light receiving elements are employed to enhance the sensitivity of the track error signals in the illustrated embodiment, it is possible to use the signal of only one of the light receiving elements in order to detect the track error signals.

It is necessary to maintain a predetermined ratio of the widths of the inner and outer light receiving areas of each light receiving element to increase the accuracy of the detected signals. In the illustrated embodiment, the ratio $\alpha$ of the widths of the light receiving areas is given by:

$$\alpha = W/d$$

wherein "W" designates the sum of the widths of the inner light receiving elements C and D, and "d" designates the beam spot diameter when in focus.

In the light receiving element split into four light receiving areas, the sensitivity of detection of the focus error signal and the track error signal increases as the ratio $\alpha$ becomes large, but the change of the track offset signal also becomes large, resulting in an undesirable increase of the track offset signal contained in the track error signal. In view of the balance of detection sensitivity and the ratio of the track offset signal, the value $\alpha$ preferably satisfies the following relationship;

$$0.3 \leq \alpha \leq 0.6$$

Figure 7:
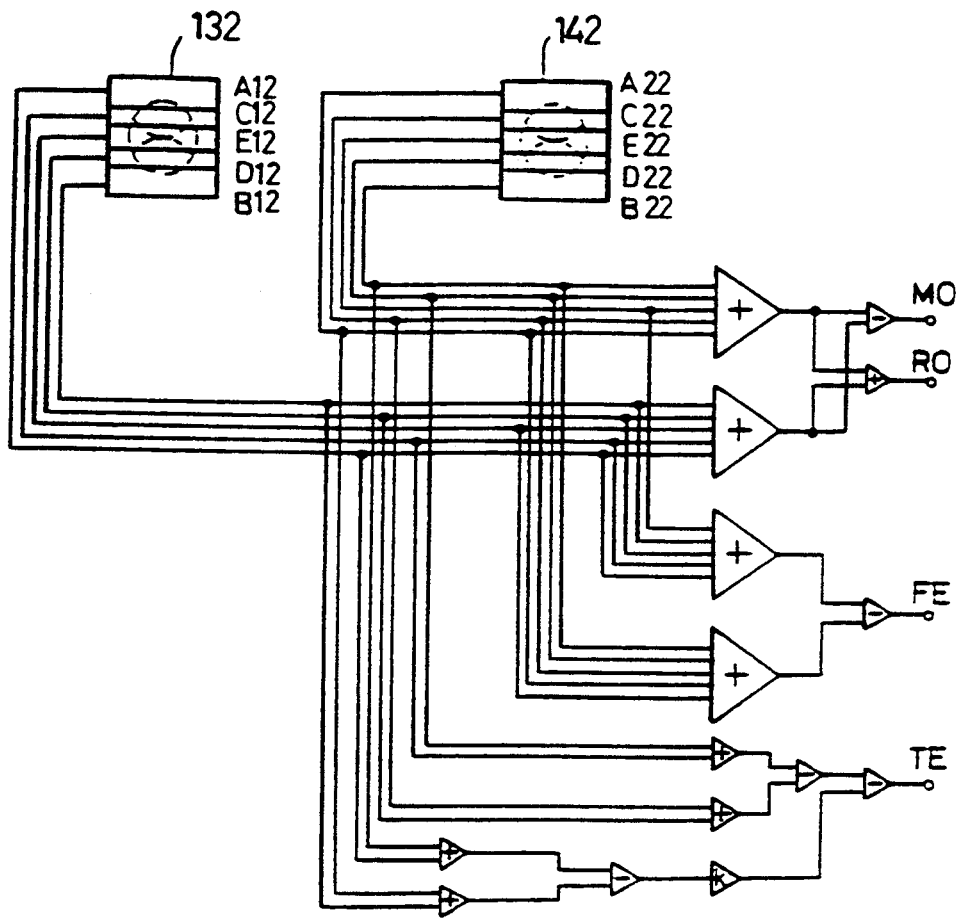
FIG. 7 is a block diagram showing a signal processing system according to a second embodiment of the present invention.
Figure 8:
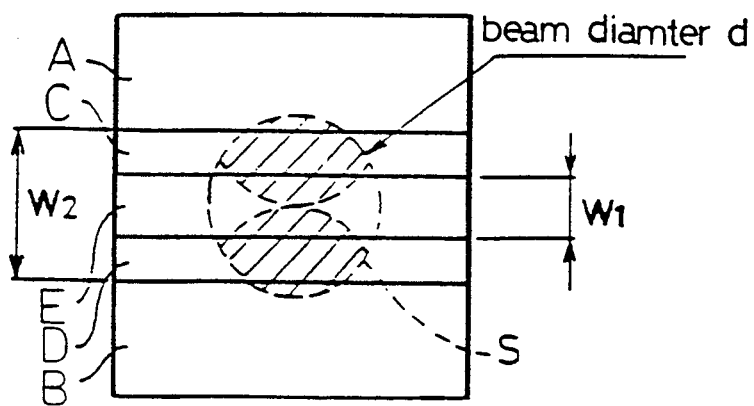
FIG. 8 is an explanatory view of light receiving areas of the light receiving element shown in FIG. 7.

FIGS. 7 and 8 show a second embodiment of a signal processing system of an optical disc apparatus according to the present invention, in which the light receiving portions of the first and second light receiving elements 132 and 142 are split into five light receiving areas (A, B, C, D, and E) in the form of elongated parallel bands. A light receiving element having a pattern of five light receiving areas is more complicated but can detect the track error signal and the focus error signal even more precisely than that of the light receiving element 13 or 14 of the first embodiment.

In the light receiving element 13 or 14 having the four light receiving areas A, B, C, and D in the first embodiment, the center line of the pattern intersecting the optical axis is optically insensible. Accordingly, if the focal point of the objective lens is deviated from the magnetic optical disc, so that the convergence point of the reflected light is located on one of the light receiving elements, a signal will not be obtained from that light receiving element. This does not occur when the light receiving element is split into five light receiving areas.

The signals mentioned above are obtained as follows.

$$MO = (A_{12} + B_{12} + C_{12} + D_{12} + E_{12}) -$$
$$(A_{22} + B_{22} + C_{22} + D_{22} + E_{22})$$
$$RO = (A_{12} + B_{12} + C_{12} + D_{12} + E_{12}) +$$
$$(A_{22} + B_{22} + C_{22} + D_{22} + E_{22})$$
$$FE = (A_{12} + B_{12} + C_{12} + D_{12} - E_{12}) -$$
$$(A_{22} + B_{22} + C_{22} + D_{22} - E_{22})$$
$$TE = (C_{12} - D_{12}) + (D_{22} - C_{22}) -$$
$$k\{(A_{12} - B_{12}) + (B_{22} - A_{22})\}$$

wherein $A_{12}$, $B_{12}$, $C_{12}$, $D_{12}$, $E_{12}$, $A_{22}$, $B_{22}$, $C_{22}$, $D_{22}$ and $E_{22}$ designate the outputs of the corresponding light receiving areas.

Magnetic optical signal MO is obtained by calculating a difference between the sum of the signals outputted from the five light receiving areas $A_{12}$ through $E_{12}$ of the first light receiving element 132 and the sum of the signals outputted from the five light receiving areas $A_{22}$ through $E_{22}$ of the second light receiving element 142, similar to the first embodiment.

Preformat signal RO is obtained by calculating the sum of the signals outputted from all the areas of the first and second light receiving elements 132 and 142, similar to the first embodiment.

Focus error signal FE, using the spot-size method, can be obtained by calculating a first quantity corresponding to inner light receiving area $E_{12}$ subtracted from a sum of signals of outer light receiving areas $A_{12}$, $B_{12}$, $C_{12}$, and $D_{12}$ of the first light receiving element 132, calculating a second quantity corresponding to inner light receiving area $E_{22}$ subtracted from a sum of signals of outer light receiving areas $A_{22}$, $B_{22}$, $C_{22}$, and $D_{22}$ of the second light receiving element 142, and then determining the difference between the first and second quantities (corresponding to the beam spot size).

Track error signal TE, using the push-pull method, can be obtained by subtracting a sum, which is first multiplied by "k", of a difference between the signals outputted from the outer light receiving areas $A_{12}$ and $B_{12}$ of the first light receiving element 132 and a difference between the signals outputted from the light receiving areas $B_{22}$ and $A_{22}$ of the second light receiving element 142 from the sum of a difference between the signals of the light receiving areas $C_{12}$ and $D_{12}$ of the first light receiving element 132 and a difference between the signals from the light receiving areas $D_{22}$ and $C_{22}$ of the second light receiving element 142. The term "k" designates a predetermined constant for appropriately weighting the sum of the difference between the signals outputted from the outer light receiving areas of the first light receiving element and the difference between the signals outputted from the outer light receiving areas of the second light receiving element. It is assumed that there is no change in output due to tracking error in the center area E.

In FIG. 8, $\alpha = W_1/d$ and $\beta = W_2/d$ wherein "$W_1$" designates the width of the center area E, "$W_2$" the sum of the widths of the areas C, D, and E, and "d" the beam diameter when in focus.

In the light receiving element of the second embodiment, which is split into five light receiving areas, the sensitivity of detection of the focus error signal increases as the value $\beta$ becomes large while the value $\beta$ remains constant, but the sensitivity of detection of the track error signal undesirably decreases and the change in the track offset signal becomes undesirably large. Conversely, as the value $\beta$ increases while the value $\alpha$ remains constant, the sensitivity of detection of the focus error and the track error increases, but the change of the track offset signal becomes large and the quantity of the track offset signal contained in the track error signal undesirably increases.

To obtain a focus error detecting differential signal between the center area E and the four remaining areas A, B, C, and D, the values $\alpha$ and $\beta$ preferably satisfy the following relationship;

$$0.3 \leq \alpha 0.5$$

$$0.7 \leq \beta 0.8$$

Figure 9:
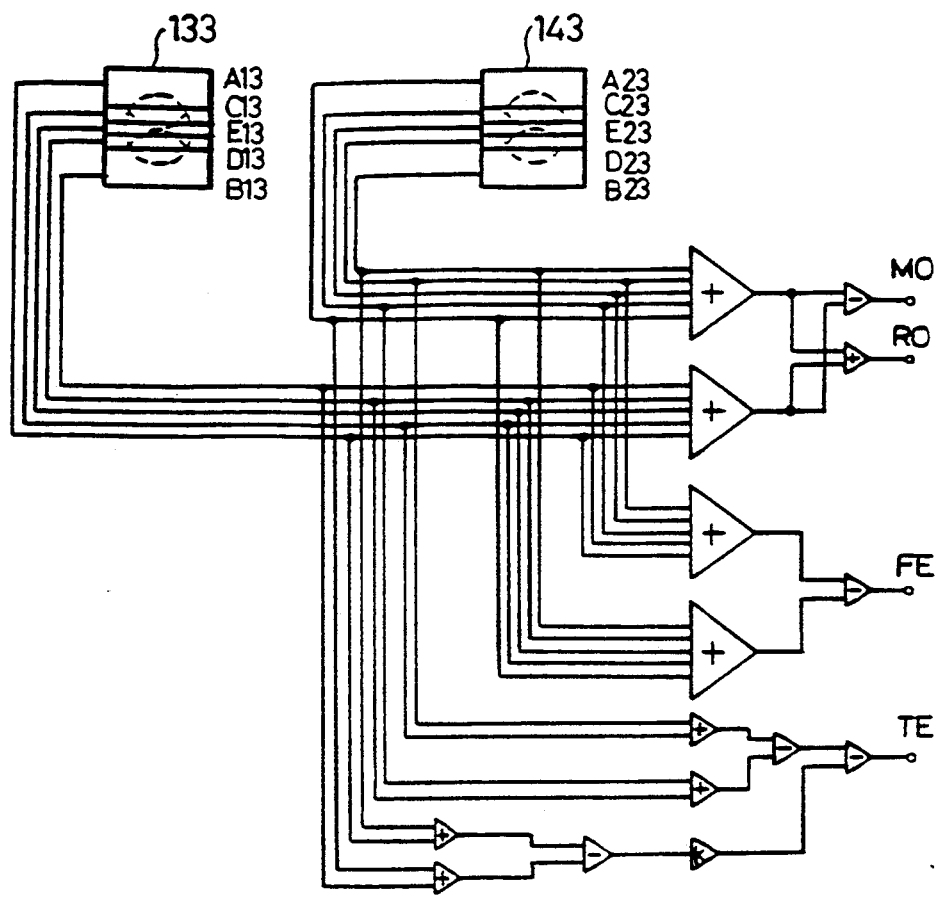
FIG. 9 is a block diagram showing a signal processing system according to a third embodiment of the present invention.
Figure 10:
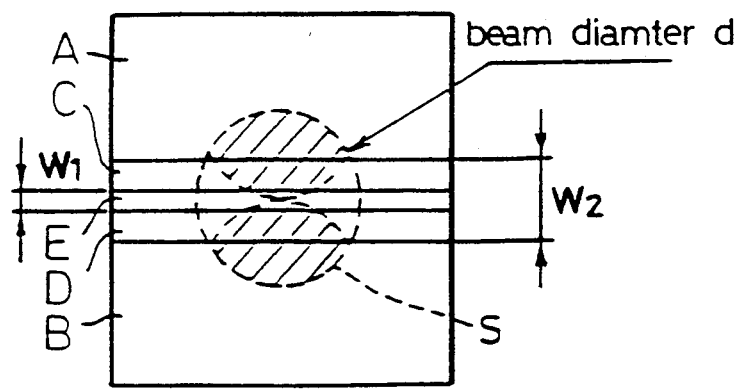
FIG. 10 is an explanatory view of light receiving areas of the light receiving element shown in FIG. 9.

FIGS. 9 and 10 show a third embodiment of a signal processing system of an optical disc apparatus according to the present invention, in which the light receiving portions of the first and second light receiving elements 133 and 143 are split into five light receiving areas (A, B, C, D, and E) in the form of elongated parallel bands, similar to FIGS. 7 and 8. In the pattern shown in FIGS. 9 and 10, three intermediate areas C, D, and E are deemed to be the center area for obtaining the differential signal.

Namely;

$$MO = (A_{13} + B_{13} + C_{13} + D_{13} + E_{13}) -$$
$$(A_{23} + B_{23} + C_{23} + D_{23} + E_{23})$$
$$RO = (A_{13} + B_{13} + C_{13} + D_{13} + E_{13}) +$$
$$(A_{23} + B_{23} + C_{23} + D_{23} + E_{23})$$
$$FE = (A_{13} + B_{13} - C_{13} - D_{13} - E_{13}) -$$
$$(A_{23} + B_{23} - C_{23} - D_{23} - E_{23})$$
$$TE = (C_{13} - D_{13}) + (D_{23} - C_{23}) -$$
$$k\{(A_{13} - B_{13}) + (B_{23} - A_{23})\}$$

wherein $A_{13}$, $B_{13}$, $C_{13}$, $D_{13}$, $E_{13}$, $A_{23}$, $B_{22}$, $C_{23}$, $D_{23}$ and $E_{23}$ designate the outputs of the corresponding light receiving areas.

In the third embodiment, unlike the second embodiment illustrated in FIGS. 7 and 8, focus error signal FE, using the spot-size method, is obtained by calculating a first quantity corresponding to a sum of signals of inner light receiving areas $C_{13}$, $D_{13}$, and $E_{13}$ subtracted from a sum of signals of outer light receiving areas $A_{13}$ and $B_{13}$ of the first light receiving element 133, calculating a second quantity corresponding to a sum of signals of inner light receiving areas $C_{23}$, $D_{23}$, and $E_{23}$ subtracted from a sum of outer light receiving areas $A_{23}$ and $B_{23}$ of the second light receiving element 143, and then determining the difference between the first and second quantities (corresponding to the beam spot size).

Track error signal TE, obtained by the push-pull method, magnetic optical disc signal MO, and preformat signal RO, are obtained similarly to the second embodiment. Note that the value of the constant k is different from that of the constant k in the second embodiment, since the total width of the areas C, D, and E is different from that in the second embodiment.

In FIG. 10, $\alpha = W_1/d$ and $\beta = W_2/d$ wherein "$W_{12}$" designates the width of the center area E, "$W_2$" the sum Of the widths of the areas C, D, and E, and "d" the beam diameter in focus, respectively.

In the light receiving element of the third embodiment in which differential signals are obtained between the three intermediate areas (center area) C, D, and E and the two outermost areas A and B, to obtain high quality signals, the values of $\alpha$ and $\beta$ preferably satisfy the following relationship;

$$0 < \alpha \leq 0.2$$

$$0.3 \leq \beta \leq 0.6$$

As can be understood from the above discussion, according to the present invention, the focusing error and the tracking error can be detected by a simple pattern of light receiving elements, and the track offset signal included in the track error signals can be eliminated by the push-pull method, resulting in a precise tracking operation.

Figure 11:
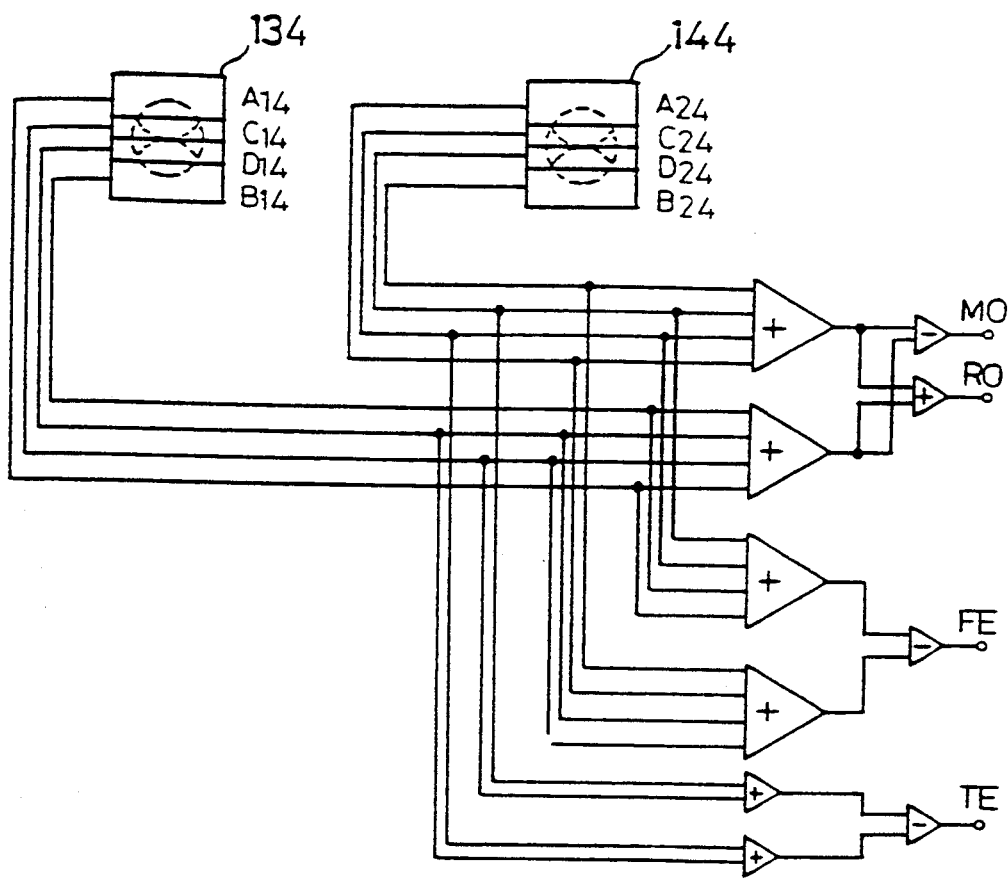
FIG. 11 is a block diagram showing a signal processing system according to a fourth embodiment of the present invention.
Figure 12:
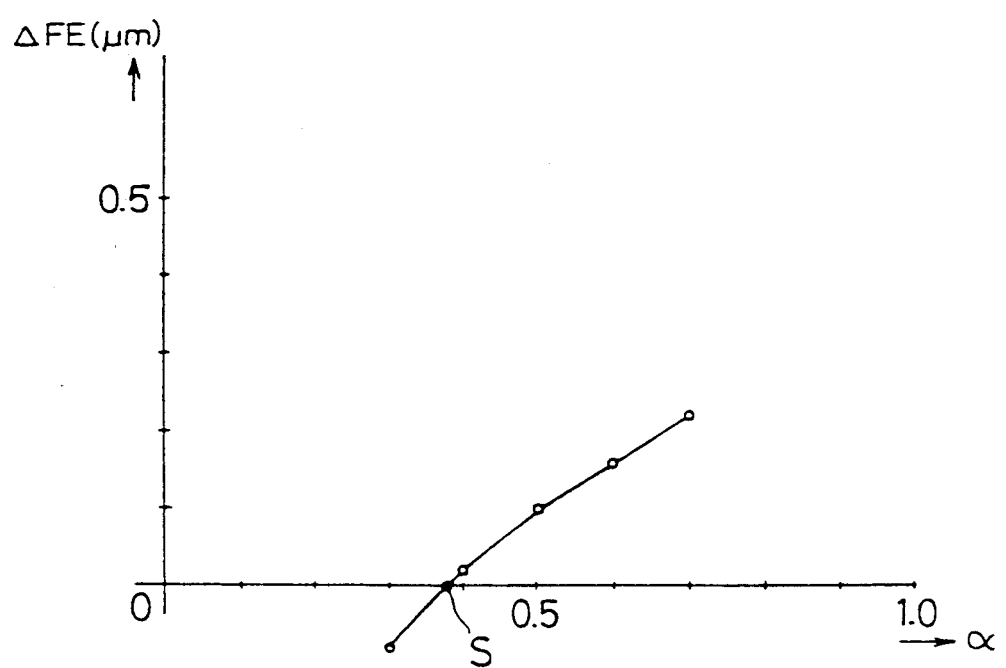
FIG. 12 is a diagram showing the amount of focus offset with respect to a value of α.

FIGS. 11 and 12 show a fourth embodiment of the present invention.

Each of the first and second light receiving elements 134 and 144 has four split sections $A_{14}$, $B_{14}$, $C_{14}$ and $D_{14}$ ($A_{24}$, $B_{24}$, $C_{24}$ and $D_{24}$) separated by the three parallel separation lines extending in the tangential direction of the magnetic optical disc MOD, as shown in FIG. 11.

The signals outputted from the respective light receiving areas $A_{14}$, $B_{14}$, $C_{14}$ and $D_{14}$ ($A_{24}$, $B_{24}$, $C_{24}$ and $D_{24}$) are processed by a signal processing circuit shown in FIG. 11, and are output to a reproduction circuit (not shown) and a servo control circuit (not shown) as magnetic optical signals MO recorded on the magnetic optical disc MOD, preformat signals RO physically recorded in the form of projections and depressions, focus error signals FE, and track error signals TE.

The signals mentioned above are obtained as follows.

$$MO = (A_{14} + B_{14} + C_{14} + D_{14}) - (A_{24} + B_{24} + C_{24} + D_{24})$$
$$RO = (A_{14} + B_{14} + C_{14} + D_{14}) + (A_{24} + B_{24} + C_{24} + D_{24})$$
$$FE = (A_{14} + B_{14} - C_{14} - D_{14}) - (A_{24} + B_{24} - C_{24} - D_{24})$$
$$TE = (C_{14} - D_{14}) + (D_{24} - C_{24})$$

wherein $A_{14}$, $B_{14}$, $C_{14}$, $D_{14}$, $A_{24}$, $B_{24}$, $C_{24}$ and $D_{24}$ designate the outputs of the corresponding light receiving areas.

As can be seen from the foregoing, the recorded magnetic optical signal MO can be obtained by calculating a sum of the signals outputted from the four light receiving areas $A_{14}$ through $D_{14}$, of the first light receiving element 134, and the sum of the signals outputted from the four light receiving areas $A_{24}$ through $D_{24}$, of the second light receiving element 144, and then calculating their difference.

The preformat signal RO can be obtained by the sum of the signals outputted from all the areas of the first and second light receiving elements 134 and 144.

The focus error signal FE, using the spot-size method, can be obtained by calculating a first quantity corresponding to a sum of signals of inner light receiving areas $C_{14}$ and $D_{14}$ subtracted from a sum of signals of outer light receiving areas $A_{14}$ and $B_{14}$ of the first light receiving element 134, calculating a second quantity corresponding to a sum of signals of inner light receiving areas $C_{24}$ and $D_{24}$ subtracted from a sum of signals of outer light receiving areas $A_{24}$ and $B_{24}$ of the second light receiving element 144, and then determining a difference between the first and second quantities (corresponding to the spot size).

It is necessary to maintain a predetermined ratio of the widths of the inner and outer light receiving areas A through D of each light receiving element in accordance with the size of the beam spot on the light receiving areas, when the objective lens 9 is in the focal position, and the energy distribution, as follows.

$$A + B = C + D$$

The coefficient $\alpha$ of the widths of the light receiving areas is given by:

$$\alpha = W/d$$

wherein "W" designates the sum of the widths of the inner light receiving areas C and D, and "d" the beam diameter on the light receiving areas when the objective lens 9 is in the focal position, respectively. The signal (A+B-C-D) output from the light receiving areas when the objective lens is in the focal position can be made zero by properly setting the value of $\alpha$.

In an example, the error component of the focus error signal, i.e., the focus offset signal $\Delta$ FE by the variation of $\alpha$ changes as shown in FIG. 12, wherein the rotation angle of the polarizing surface due to the magnetic Kerr effect, is 0.5°, the variation in the quantity of light caused thereby is 4%, the focal length of the condenser lens 11 is 40 mm, and the beam diameter d=250$\mu$. Namely, FIG. 12 shows the variation of the focus offset signal $\Delta$FE when the value of $\alpha$ varies in the focal state of the objective lens, that is, the amount of focus offset caused by the magnetic optical signal.

As can be seen from FIG. 12, when $\alpha$ is set to be a value identical to the intersecting point S at which the curve intersects the abscissa (in the illustrated embodiment, $\alpha = 0.38$), the spot size signal (A+B-C-D) output from the light receiving areas when the objective lens is in the focal position can be set to zero.

Thus, it is possible to independently adjust the position of the light receiving elements in such a way that the spot size signals of the light receiving elements are zero. Even if there is a change in the quantity of light incident upon the light receiving elements 134 and 144 upon reproduction of the magnetic optical signal, as long as the spot size does not change, so that the spot size signals output from the light receiving elements are maintained zero, the magnetic optical signal can not be contained in the focus error signal as a noise signal.

Track error signal TE, using the push-pull method, can be obtained by subtracting the sum of a signal outputted from one of the inner light receiving areas of the first light receiving element 134 ($D_{14}$) and a signal from one of the inner light receiving areas of the second light receiving element 144 ($C_{24}$), from the sum of a signal light receiving element 134 ($C_{14}$) and a signal outputted from the other inner light receiving area of the second light receiving element 144 ($D_{24}$).

In the light receiving element having the four split light receiving areas, as the value of a increases, the sensitivity of detection of the focus error and track error signals increases, but the track offset signal contained in the track error signal is also undesirably increased. To balance the detection sensitivity and the ratio of the track offset signal in the track error signal, the valve a preferably satisfies the following relationship;

$$0.3 \leq a \leq 0.6$$

Note that $\alpha$ is equal to 0.38 in the illustrated embodiment, as mentioned above.

Although only the outputs from the two inner light receiving areas C and D are used to detect the track error signal in the illustrated embodiment, it is also possible to use all the outputs of the four light receiving areas A through D.

Furthermore, although the signals of the two light receiving elements are employed to enhance the sensitivity of the track error signal, it is possible to use only one of the light receiving elements to detect the track error signal.

Figure 13:
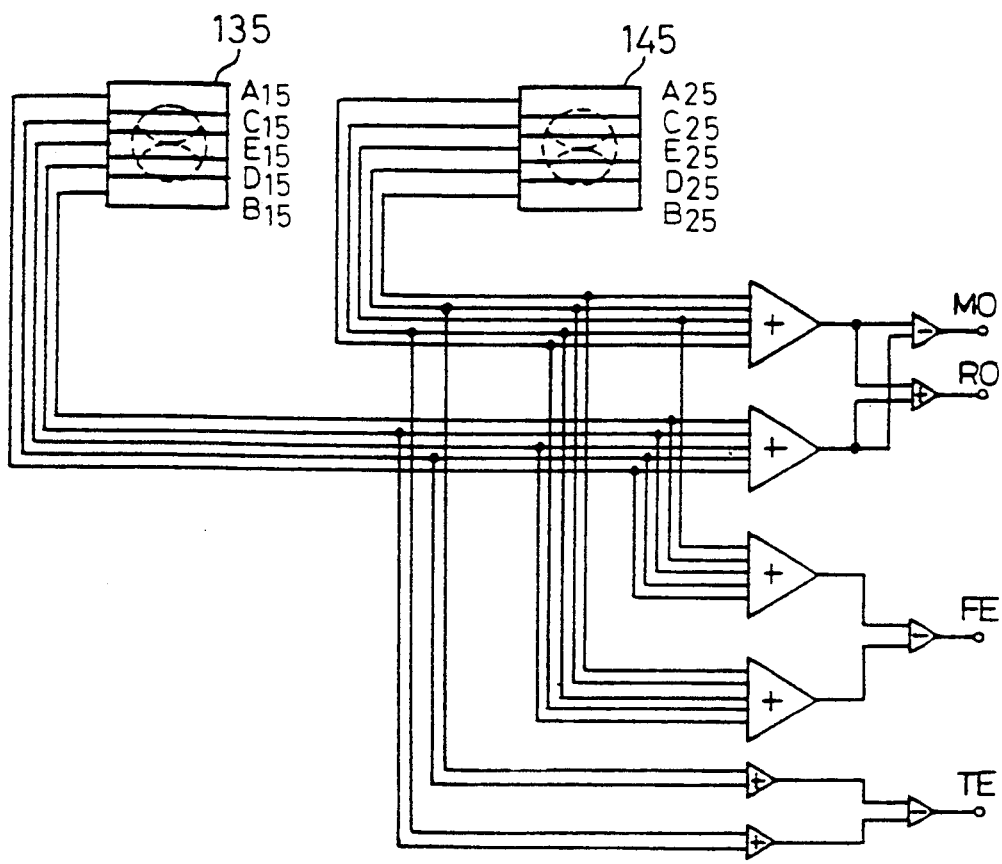
FIG. 13 is a block diagram showing a signal processing system according to a fifth embodiment of the present invention.

FIG. 13 shows a fifth embodiment of a signal detecting system according to the present invention.

In FIG. 13, the light receiving portions of the first and second light receiving elements 135 and 145 are split into five light receiving areas (A, B, C, D and E) in the form of elongated parallel bands separated by parallel separation lines. The pattern of the light receiving element having the five light receiving areas is more complicated, but can detect the track error signal and the focus error signal more precisely than that of the light receiving elements in the first embodiment.

In the light receiving element having the four split light receiving areas (A, B, C, and D in the fourth embodiment), the center line of the pattern intersecting the optical axis is optically insensible. Accordingly, if the focal point of the objective lens is deviated from the magnetic optical disc, so that the convergent point of the reflected light is located on the insensible zone of one of the light receiving elements, a signal cannot be obtained from that light receiving element. This does not occur when the light receiving element is split into five light receiving areas.

The signals mentioned above are obtained as follows.

$$MO = (A_{15} + B_{15} + C_{15} + D_{15} + E_{15}) -$$
$$(A_{25} + B_{25} + C_{25} + D_{25} + E_{25})$$

$$RO = (A_{15} + B_{15} + C_{15} + D_{15} + E_{15}) +$$
$$(A_{25} + B_{25} + C_{25} + D_{25} + E_{25})$$

$$FE = (A_{15} + B_{15} + C_{15} + D_{15} - E_{15}) -$$
$$(A_{25} + B_{25} + C_{25} + D_{25} - E_{25})$$

-continued
$$TE = (C_{15} + D_{25}) - (C_{25} + D_{15})$$

wherein $A_{15}$ through $E_{15}$ and $A_{25}$ through $E_{25}$ designate the outputs of the corresponding light receiving areas.

Magnetic optical signal MO is obtained by a difference between the sum of the signals outputted from the five light receiving areas $A_{15}$ through $E_{15}$ of the first light receiving element 135, and the sum of the signals outputted from the five light receiving areas $A_{25}$ through $E_{25}$ of the second light receiving element 145, respectively, similar to the fourth embodiment.

Preformat signal RO is obtained by calculating the sum of the signals outputted from all the areas of the first and second light receiving elements 135 and 145, similar to the fourth embodiment.

Focus error signal FE, using the spot-size method, can be obtained by calculating a first quantity corresponding to inner light receiving area $E_{15}$ subtracted from a sum of signals of outer light receiving areas $A_{15}$, $B_{15}$, $C_{15}$, and $D_{15}$ of the first light receiving element 135, calculating a second quantity corresponding to inner light receiving area $E_{25}$, subtracted from a sum of signals of outer light receiving areas $A_{25}$, $B_{25}$, $C_{25}$, and $D_{25}$ of the second light receiving element 145, and then determining the difference between the first and second quantities (corresponding to the beam spot size).

In the fifth embodiment, the ratio of the widths of the light receiving areas A through E of each light receiving element is determined to satisfy the following relationship between the outputs thereof.

$$E = A + B + C + D$$

Consequently, it is possible to easily adjust the position of the light receiving elements in such a way that the spot size signal (A+B+C+D-E) of the light receiving elements is zero, with no magnetic optical signal being contained in the focus error signal as a noise, similar to the fourth embodiment.

Track error signal TE, using the push-pull method, can be obtained by subtracting the sum of a signal, outputted from one of the inner light receiving areas of the second light receiving element 145 ($C_{25}$), and a signal from one of the inner light receiving areas of the first light receiving element 135 ($D_{15}$), from the sum of a signal from the other inner light receiving area of the first light receiving element 135 ($C_{15}$), and a signal outputted from the other inner light receiving area of the second light receiving element 145 ($D_{25}$).

Although the above discussion has been directed to the light receiving element having four or five split light receiving areas, the present invention is not limited thereto. Namely, the invention can be applied to a focus error signal detecting apparatus in which each light receiving element is split into less than four or more than five light receiving areas.

As can be understood from the above discussion, it is possible to separately adjust the position of the light receiving elements in such a way that the spot size signals of the light receiving elements are zero, while no magnetic optical signal is contained in the focus error signal as noise, particularly when the invention is applied to a magnetic optical disc apparatus.

According to the present invention, it is possible to provide a simple signal detecting system of an optical disc apparatus, in which both the focus and track error signals are detected by the same light receiving elements, each having a simple split pattern of the light receiving areas.

The first and second light receiving elements 135 and 145 are split into five light receiving areas (A, B, C, D and E) in the form of elongated parallel bands which are also parallel with the tangential direction of the magnetic optical disc MOD. The split pattern of the five light receiving areas is more complicated, but can detect the track error signal and the focus error signal more precisely than the split pattern of four light receiving areas.

In the light receiving element having four (even number) split light receiving areas A, B, C, and D, the center line of the pattern intersecting the optical axis is optically insensible. Accordingly, if the focal point of the objective lens is deviated from the magnetic optical disc, so that the convergent point of the reflected light is located on the insensible zone of one of the light receiving elements, a signal cannot be obtained from that light receiving element. This does not occur when the light receiving element is split into five (i.e., an odd number of) light receiving areas.

Figure 14:
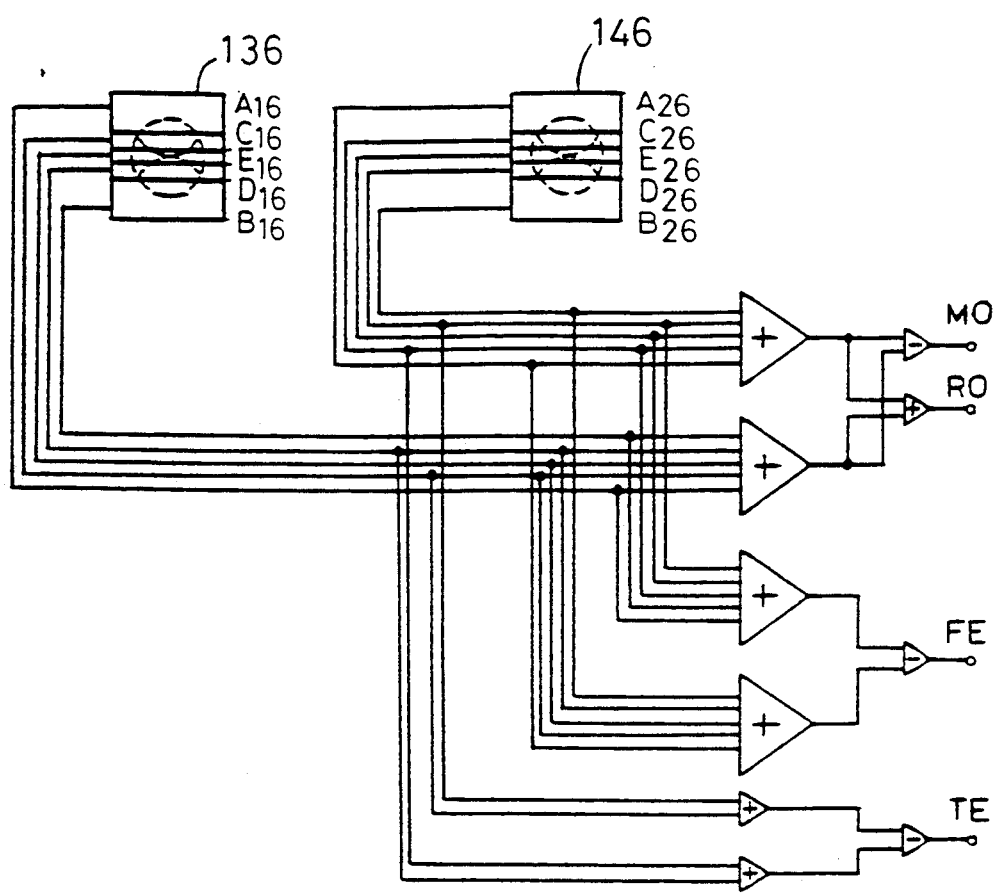
FIG. 14 is a block diagram showing a signal processing system according to a sixth embodiment of the present invention.

The signals outputted from the respective light receiving areas are processed by a signal processing circuit shown in FIG. 14, and are outputted to a reproduction circuit (not shown) and a servo control circuit (not shown) as magnetic optical signals MO recorded on the magnetic optical disc MOD, preformat signals RO physically recorded in the form of projections and depressions, focus error signals FE, and track error signals TE.

To satisfy the requirements of the sensitivity of the signals to be detected, etc., it is necessary to restrict the ratio of width between the light receiving areas within predetermined limits. To this end, for example in FIG. 8, $$\alpha = W_1/d$$

$$\beta = W_2/d$$

wherein "$W_1$" designates the width of the center area E, "$W_2$" the sum of the widths of the areas C, D, and E, and "d" the beam diameter in focus, respectively.

In the light receiving element having the five light receiving areas, as the value of $\alpha$ increases, the sensitivity of detection of the focus error signals increases, but the sensitivity of detection of the track error signals decreases, provided that $\beta$ is constant. Conversely, if $\alpha$ is constant, as the value of $\beta$ increases, the sensitivity of detection of the focus error and track error signals increases, but the change in the track offset signal and the quantity of the track offset signal contained in the track error signal is undesirably increased.

To balance the detection sensitivity and the ratio of the track offset signal in the track error signal, the values $\alpha$ and $\beta$ preferably satisfy the following relationship;

$$0.3 \leq \alpha \leq 0.5$$

$$0.7 \leq \beta \leq 0.8$$

FIG. 14 shows a sixth embodiment of a signal processing system of an optical disc apparatus according to the present invention, in which the light receiving portions of the first and second light receiving elements 136 and 146 are split into five light receiving areas (A, B, C, D, and E) in the form of elongated parallel bands, similar to the fifth embodiment.

The signals mentioned above are obtained as follows.

$$MO = (A_{16} + B_{16} + C_{16} + D_{16} + E_{16}) -$$
$$(A_{26} + B_{26} + C_{26} + D_{26} + E_{26})$$

$$RO = (A_{16} + B_{16} + C_{16} + D_{16} + E_{16}) +$$
$$(A_{26} + B_{26} + C_{26} + D_{26} + E_{26})$$

$$FE = (A_{16} + B_{16} - C_{16} - D_{16} - E_{16}) -$$
$$(A_{26} + B_{26} - C_{26} - D_{26} - E_{26})$$

$$TE = (C_{16} + D_{26}) - (C_{26} + D_{16})$$

wherein $A_{16}$ through $E_{16}$ and $A_{26}$ through $E_{26}$ designate the outputs of the corresponding light receiving areas.

The magnetic optical signal MO, the preformat signal RO, and the tracking error signal TE can be obtained in the same way as the fifth embodiment mentioned above.

Focus error signal FE, using the spot-size method, can be obtained by calculating a first quantity corresponding to a sum of signals of inner light receiving areas $C_{16}$, $D_{16}$, and $E_{16}$ subtracted from a sum of outer light receiving areas $A_{16}$ and $B_{16}$ of the first light receiving element 136, calculating a second quantity corresponding to a sum of signals of inner light receiving areas $C_{26}$, $D_{26}$, and $E_{26}$ subtracted from a sum of outer light receiving areas $A_{26}$ and $B_{26}$ of the second light receiving element 146, and then determining the difference between the first and second quantities (corresponding to the beam spot size).

Since the total width of the areas C, D, and E is different from that of the fifth embodiment, the values of $\alpha$ and $\beta$ preferably satisfy the following requirements.

$$\alpha = W_1/d$$

$$\beta = W_w/d$$

wherein "$W_1$" designates the width of the center area E, "$W_2$" the sum of the widths of the areas C, D, and E, and "d" the beam diameter in focus, respectively.

To obtain high quality signals, the values $\alpha$ and $\beta$ are preferably given by;

$$0 < \alpha \leq 0.2$$

$$0.3 \leq \beta \leq 0.6$$

As can be understood from the above discussion, according to the present invention, both the focusing error and the tracking error can be detected by the same light receiving elements.

We claim:
1. A signal detecting apparatus in an optical disc apparatus comprising:
    an objective lens which converges light emitted from a light source onto an optical disc;
    a beam splitter which splits the light reflected by the optical disc into two beams of light;
    a condenser lens which converges the reflected light;
    a first light receiving element located before a convergent point on which the light reflected from the optical disc is converged when the objective lens is in a focal position; and,
    a second light receiving element located behind the convergent point;

said first and second light receiving elements being provided with light receiving surfaces, each light receiving surface being split into more than three light receiving areas in the form of elongated bands which extend in a direction corresponding to a tangential direction of the optical disc;

said first and second light receiving elements being constructed so that the signals outputted from the respective light receiving areas are zero when the objective lens is in the focal position, wherein the signals outputted from the respective light receiving areas correspond to the diameter of the beam spot representing the focus error signal detected by a spot-size method, and the number of light receiving areas of each said light receiving element is five, wherein four of the light receiving areas are located outwardly of a center of the corresponding beam spot and the fifth light receiving area is located centrally with regard to the corresponding beam spot, so that the difference between the total output of the four outer light receiving areas of the respective light receiving elements and the output of the center light receiving area thereof is zero.

2. A signal detecting apparatus in an optical disc apparatus including an objective lens which converges light emitted from a light source onto an optical disc, a beam splitter which splits the light reflected by the optical disc and transmitted through the objective lens into a plurality of beams of light, and a condenser lens which converges the reflected light, comprising:

a first light receiving element located before a convergent point on which the light reflected from the optical disc is converged when the objective lens is in a focal position, said first light receiving element being provided with a light receiving surface split into first light receiving areas extending in a direction optically parallel with a tangential direction of the optical disc; said five light receiving areas comprising a central light receiving area with respect to the convergent light beams, a pair of inner light receiving areas and a pair of outermost light receiving areas, said inner light receiving areas outlying said central light receiving areas, and said outermost light receiving areas outlying said inner light receiving areas wherein said central light receiving area and said inner light receiving areas together comprise innermost light receiving areas and, a second light receiving element located behind the convergent point, and being provided with a light receiving surface split into five light receiving areas extending in a direction corresponding to the tangential direction of the optical disc, said five light receiving areas comprising a central light receiving area with respect to the convergent light beams, a pair of inner light receiving areas and a pair of outermost light receiving areas, said inner light receiving areas outlying said central light receiving area, and said outermost light receiving areas outlying said inner light receiving areas wherein said central light receiving area and said inner light receiving areas together comprise innermost light receiving areas, and a tracking error is detected in accordance with a sum of a signal outputted from one of said inner light receiving areas of said first light receiving element and a signal outputted from one of said inner light receiving areas of said second light receiving element subtracted from a sum of a signal outputted from another of said inner light receiving areas of said first light receiving element and a signal outputted from another of said inner light receiving areas of said second light receiving element;

said signal detecting apparatus further comprising calculating means for calculating a first quantity corresponding to a sum of outputs of three said innermost light receiving areas subtracted from a sum of outputs of two said outermost light receiving areas of said first light receiving element, calculating a second quantity corresponding to a sum of outputs of three said innermost light receiving areas subtracted from a sum of two said outermost light receiving areas of said second light receiving element, and then determining a difference between the first and second quantities to output a focus error signal in accordance with said difference.

3. A signal detecting apparatus according to claim 2, further comprising a calculating means for calculating a first quantity corresponding an innermost light receiving area subtracted from a sum of remaining four outermost light receiving areas of said first light receiving element, calculating a second quantity corresponding to an innermost light receiving area subtracted from a sum of remaining four outermost light receiving areas of said second light receiving element and then determining a difference between the first and second quantities to output a focus error signal in accordance with said difference.

4. A signal detecting apparatus according to claim 3, wherein each of said first and second light receiving elements has a pattern of light receiving areas which satisfies the following relationship;

$$0 \leq w_1/d \leq 0.1;$$

$$0.3 \leq w_2/d \leq 0.6$$

wherein "$w_1$" designates the width of the innermost light receiving area, "$w_2$" the total width of three innermost light receiving areas, and "d" the beam diameter of the reflected light on said light receiving elements when the objective lens is in the focal position, respectively.

5. A signal detecting apparatus according to claim 2, wherein each of the first and second light receiving elements has a pattern of light receiving areas which satisfies the following relationship:

$$0.3 \leq w_1/d \leq 0.5;$$

$$0.7 \leq w_2/d \leq 0.8$$

wherein "$w_1$" designates the width of the center light receiving area, "$w_2$" the total width of three innermost light receiving areas, and "d" the beam diameter of the reflected light on the light receiving elements when the objective lens is in the focal position, respectively.

6. A signal detecting apparatus in an optical disc apparatus including an objective lens which converges light beams emitted from a light source onto an optical disc, comprising:

a first light receiving element located before a convergent point on which light reflected from the optical disc is converged when the objective lens is in a focal position, said first light receiving element being provided with a light receiving surface split into five light receiving areas extending in a direction optically parallel with a tangential direction of the optical disc, said five light receiving areas comprising a central light receiving area with respect to the convergent light beams, a pair of inner light receiving areas and a pair of outermost light receiving areas, said inner light receiving areas outlying said central light receiving area, and said outermost light receiving areas outlying said inner light receiving areas wherein said central light receiving area and said inner light receiving areas together comprise innermost light receiving areas and, a second light receiving element located behind the convergent point, and being provided with a light receiving surface split into five light receiving areas extending in a direction corresponding to the tangential direction of the optical disc, said five light receiving areas comprising a central light receiving area with respect to the convergent light beams, a pair of inner light receiving areas and a pair of outermost light receiving areas, said inner light receiving areas outlying said central light receiving area, and said outermost light receiving areas outlying said inner light receiving areas wherein said central light receiving area and said inner light receiving areas together comprise innermost light receiving areas, said first and second light receiving elements being constructed so that the difference between signals outputted from a first group comprising at least one of said innermost light receiving areas and a second group comprising said pair of outermost light receiving areas is zero when the objective lens is in the focal position.

7. A signal detecting apparatus in an optical disc apparatus according to claim 6, wherein said first group comprises three of said innermost light receiving areas.

8. A signal detecting apparatus in an optical disc apparatus according to claim 6, wherein said first group comprises said central light receiving area and said second group comprises said inner light receiving areas and said outermost light receiving areas.

9. A signal detecting apparatus in an optical disc apparatus according to claim 6, wherein a tracking error is detected in accordance with a sum of a signal outputted from one of said pair of inner light receiving areas of said first light receiving element and a signal outputted from one of said pair of inner light receiving areas of said second light receiving element subtracted from a sum of a signal outputted from the other of said pair of inner light receiving areas of said first light receiving element and a signal outputted from the other of said pair of inner light receiving areas of said second light receiving element.

10. A signal detecting apparatus in an optical disc apparatus according to claim 6, wherein a magnetic optical recording signal is determined in accordance with a difference between a sum of said signal outputs of all of the light receiving areas of one of said light receiving elements and a sum of the signal outputs of all of the light receiving areas of the other of said light receiving elements.

11. A signal detecting apparatus in an optical disc apparatus according to claim 6, wherein a preformat signal is determined in accordance with a sum of the signal outputs of all of the light receiving areas of both of said light receiving elements.

* * * * *

UNITED STATES PATENT AND TRADEMARK OFFICE
CERTIFICATE OF CORRECTION

PATENT NO. : 5,278,401
DATED : January 11, 1994
INVENTOR(S) : S. TAKISHIMA et al.

It is certified that error appears in the above-indentified patent and that said Letters Patent is hereby corrected as shown below:

At column 17, line 36 (claim 2, line 13) of the printed patent, change "first" to ---five---.

At column 17, line 43 (claim 2, line 20) of the printed patent, change "areas" to ---area---.

At column 18, line 36 (claim 4, line 5) of the printed patent, change "$0 \leq w_1/d \leq 0.1;$" to ---$0 \leq w_1/d \leq 0.2;$---.

Signed and Sealed this

Twelfth Day of November, 1996

Attest:

BRUCE LEHMAN

Attesting Officer    Commissioner of Patents and Trademarks